Dec. 25, 1962     C. B. ROGERS ETAL     3,070,190
DEFLECTION BEAM CONSTRUCTION
Original Filed Nov. 22, 1957
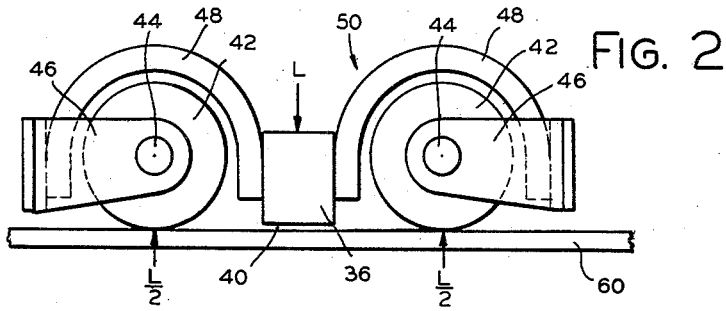
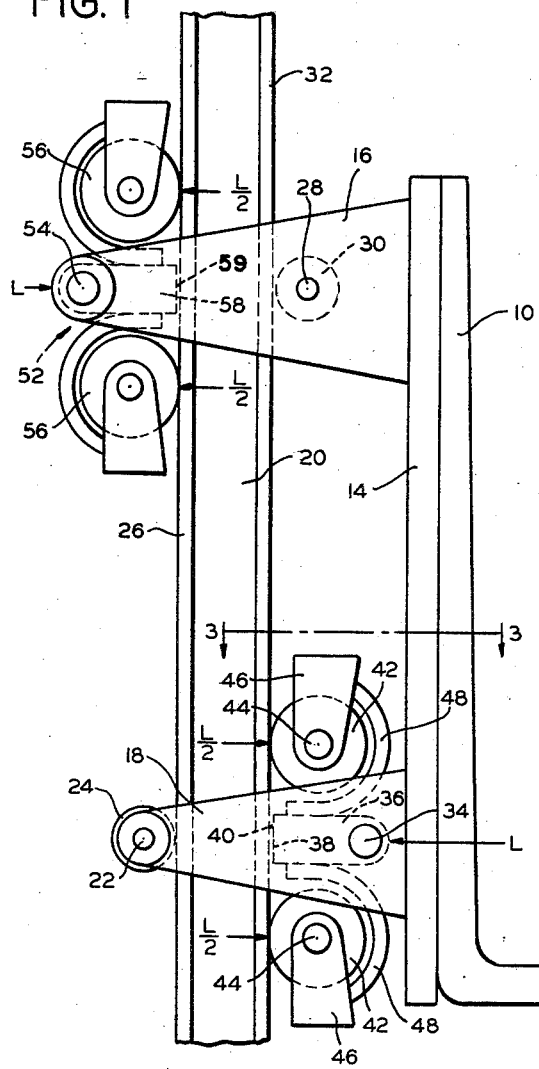
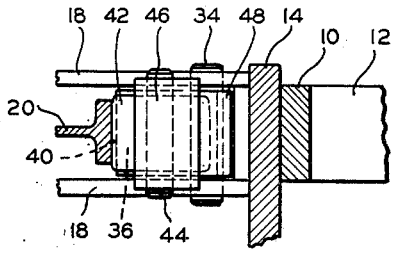
INVENTORS.
CYRIL B. ROGERS
KENNETH H. MINDRUM
BY
*J. C. Wiessler*
ATTY.

United States Patent Office 3,070,190
Patented Dec. 25, 1962

3,070,190
DEFLECTION BEAM CONSTRUCTION
Cyril B. Rogers and Kenneth H. Mindrum, Battle Creek, Mich., assignors to Clark Equipment Company, a corporation of Michigan
Continuation of abandoned application Ser. No. 698,278, Nov. 22, 1957. This application Jan. 3, 1961, Ser. No. 80,494
11 Claims. (Cl. 187—95)

This invention relates to a deflection beam construction and more particularly to a load bearing member which is deflectable to redistribute upon a reaction member a load borne by the load bearing member following an increase in said load above a predetermined amount. This application comprises a continuation of our application Ser. No. 698,278, filed November 22, 1957, now abandoned.

In certain constructions wherein a load bearing member and a reaction member cooperate to sustain some given substantially static load, impact or dynamic loads are sometimes imposed which may greatly exceed the safe loading of the structure with consequent failure thereof unless the structure is designed to sustain such impact loads. However, if such a structure is designed to withstand high impact loads, which may be infrequently applied thereto, it is apparent that the structure would be inefficient in the sense of providing an excessive safety factor for maximum allowable static loading thereof.

Our invention has for its principal object the provision of an improved and efficient static load bearing structure which is capable of safely withstanding high impact or dynamic loads which may far exceed the safe static loading limitations.

It is another object of our invention to provide in material handling vehicles and the like a deflectable load bearing member and a reaction member therefor, wherein the distribution of a force applied to the reaction member through the load bearing member may vary with the loading as reflected in deflection of the load bearing member.

In carrying out our invention we have provided a deflectable beam construction which normally is in abutment with a resistance member at certain spaced locations along the beam construction, and which deflects toward the resistance member to increase the number of positions of abutment therewith following the imposition thereon of an excessive load, whereby the excessive load is redistributed along the beam construction such that it does not overstress any portion thereof.

In the drawings:

FIGURE 1 is a side view in elevation of our deflection beam construction applied between a load lifting member and one of the upright sections of the lifting mast of an industrial lift truck;

FIGURE 2 is an enlarged elevation view of our beam construction; and

FIGURE 3 is a sectional view taken on line 3—3 of FIGURE 1.

Referring now in detail to the drawing, numeral 10 indicates an L-shaped load engaging fork tine having a horizontally extending load engaging portion 12, the tine 10 being secured to a carrier plate 14 therefor to which is rigidly secured pairs of generally triangularly shaped and vertically spaced brackets 16 and 18, each pair of which spans laterally and extends rearwardly beyond an I-shaped vertical reaction member 20. In the exemplary embodiment of FIGURE 1, the reaction member 20 represents one of a pair of upright mast sections of an industrial lift truck.

Rotatably mounted adjacent and between the apex portion of the bracket members 18 on a horizontally extending pin 22, which is supported by said bracket members, is a roller 24 which is adapted for rolling engagement with a flange 26 of the beam 20. Similarly, a pin 28 extends between bracket members 16 in the central portion thereof and supports a roller 30 which is adapted for rolling engagement with a flange 32 of the I-beam. Normally, a slight clearance exists between the peripheral portions of rollers 24 and 30 and the flanges 26 and 32, respectively, of the I-beam; the rollers are available to provide a resistance couple in the event that an upwardly directed force should be imposed on the horizontal section 12 of the fork tine 10.

A transverse pin member 34 extends between and is supported by the pair of bracket members 18 near the base portion thereof. Secured to the pin member 34 between the bracket members 18 is a generally block-shaped member 36 which projects horizontally from the pin member in the direction of the flange 32 and which terminates at one end thereof in a surface 38 maintained normally out of abutment with the outer surface of flange 32 as indicated by the space 40 therebetween. A pair of rollers 42 are mounted in vertically spaced relation on opposite sides of the block member 36 and are mounted upon pins 44 for rolling engagement with the flange 32, said pins being rigidly secured to oppositely extending bracket members 46 which are in turn connected to upper and lower horizontal surfaces of block member 36 by a pair of arcuate elements 48.

The block member 36, arcuate members 48, brackets 46 and rollers 42 together comprises what is herein termed a deflection beam construction, which may be hereinafter referred to generally by numeral 50 for convenience.

A deflection beam construction 52, which is preferably of the same design as deflection beam 50, extends between the bracket members 16 and is connected by means of a pin 54 adjacent and between the apex portion thereof such that rollers 56 thereof are adapted to have rolling engagement with the other flange 26 of I-beam 20. Block member 58 of beam 52 is mounted in the same manner as block member 36 of deflection beam 50, having a normal clearance indicated at numeral 59 between the one end surface thereof and the outer surface of flange 26.

All parts of the deflection beam assemblies 50 and 52, excepting the roller sets 42 and 56 which are mounted for rotation on the respective pin members, are rigidly connected together, as by welding.

Our deflection beam construction has been described in the environment of an upright and load engaging fork tine for an industrial lift truck, wherein it is usual to provide hydraulic hoisting means connected to the fork tine for actuating same in a vertical direction relative to the upright. Details of such construction are not disclosed herein since it is not necessary to a complete understanding of this invention; however, the details of construction of an industrial lift truck of the general type herein referred to are fully disclosed in the copending U.S. application Ser. No. 630,207 filed December 24, 1956 in the name of K. H. Mindrum, now Patent No. 2,904,203.

It will, of course, be understood that this invention is not limited by the showing of its application to an upright of an industrial lift truck, which is disclosed herein as an exemplary embodiment of the invention. As the description proceeds it will become apparent to persons skilled in the art that our invention may be embodied in numerous combinations of structure.

Referring particularly now to FIGURE 2, it will be seen that the deflection beam construction 50 is associated with a reaction member 60 in order to distribute a load L applied centrally of the deflection beam along the transverse areas of contact between rollers 42 and reaction member 60 so that a load of L/2 is imposed on each roller 42 and resisted by member 60. Where such rollers are used in the manner shown, it will be seen that relatively high unit static loads will be sustained by each roller for a given high static load L because of the relatively small area of contact between the peripheral surface of each roller and the member 60.

For a given maximum safe static load L, our deflection beam may be designed to merely safely support such static load with a normal built-in safety factor for static loading. With a given roller design, a given rigidity and strength of material of the members 44, 46 and 48, and a pre-selected effective length of the beam construction, for example, the block 36 may be positioned with respect to member 60 so that upon the imposition of a predetermined excess load, block 36 will be deflected through clearance 40 and the surface thereof adjacent member 60 moved into abutment with member 60, whereby any additional load will be imposed not upon rollers 42 but upon block 36, and the total excess load will thereupon be distributed throughout the added area of contact between block 36 and member 60. Thus, even though a maximum allowable static load L be dropped from a given height to impose an additional impact or dynamic load upon assembly 50, rollers 42 will not be subjected to such impact loading since block 36 will be instantaneously deflected into abutment with reaction member 60, thereby to transfer the excess portion of the load not through the rollers 42 but directly upon member 60 through block 36.

As applied to the upright I-beam 20 in FIGURE 1, a capacity static load P may be imposed upon the fork tine 10. The load P is taken by a resisting couple between the roller sets 42 and 56 and the I-beam. If, for example, an industrial truck with which the upright 20 may be associated is traveling over rough terrain, the load P may be jostled sufficiently on the fork tines to cause high impact loadings, in which case any excess of total load over load P will be resisted by the flanges 26 and 32 of the I-beam in abutment with block members 36 and 58, as above described, thereby relieving excessive loading on the roller sets 42 and 56. The roller sets and associated parts may thus be designed to enjoy long life and service while being efficiently employed to sustain a static load P only.

While we have described only one embodiment of our invention, it will be apparent to persons skilled in the art that various modifications in the form, construction and arrangement of parts may be made without departing from the scope thereof.

We claim:

1. In combination, a longitudinally extending structural member, and a loadable beam construction movable along said member and having a pair of roller means mounted for rolling engagement with said member and in spaced relation to each other, a pair of arcuate members connected to the roller means adjacent the remote sides thereof and extending circumferentially outwardly of the roller means into the space between the roller means and a movable element secured to the adjacent ends of said arcuate members in the space between the roller means and in predetermined spaced relation to the structural member, said movable element being deflectible with the arcuate members under load through said predetermined space and into abutment with said longitudinal member in order to redistribute the loading on the longitudinal member.

2. A combination as claimed in claim 1 wherein connecting means are connected to each of said roller means and extend outwardly thereof in spaced relation to said longitudinal member, said arcuate members being secured to said connecting members circumferentially outwardly of the remote sides of said rollers.

3. A combination as claimed in claim 1 wherein said movable element is located in a plane substantially midway between said roller means.

4. A combination as claimed in claim 1 wherein bracket means is connected to said loadable beam construction and extends transversely thereof toward the opposite side of said structural member, and means supported from said bracket means on the opposite side of said structural member for engaging said structural member.

5. A combination as claimed in claim 1 wherein a second said loadable beam construction is located on the opposite side of said structural member and in longitudinally spaced relation to the first loadable beam construction, and load supporting means supported from both said loadable beam constructions and movable therewith along said structural member.

6. A combination as claimed in claim 5 wherein connector means are connected to each said loadable beam constructions and to said load supporting means, and a load bearing member supported on each said connector member on a side of said structural member opposite the side of engagement thereof with each said loadable beam construction.

7. A deflection beam construction associated with a resistance member comprising a pair of rollers mounted in spaced relation to each other and having rolling engagement with the resistance member, means mounting said rollers for rotation thereon, bracket means supported by the mounting means extending outwardly in opposite directions from said mounting means, a pair of arcuate members connected to said bracket means adjacent opposite outer ends thereof, spanning said pair of rollers circumferentially and extending into the space therebetween, and a deflectible member connected to the inner portions of said spanning arcuate members to form therewith and with said bracket means and rollers a deflectible beam, said deflectible member being in normal spaced relation from the resistance member and deflectible into abutment therewith upon the application thereto of a predetermined load in excess of that normally sustainable by said rollers.

8. In combination, an upwardly extending beam, a load supporting means movable along said beam, and deflection beam means operatively connected to said load supporting means for supporting same on said upwardly extending beam, said deflection beam means including a pair of rollers mounted in spaced relation to each other and having rolling engagement with one side of said upwardly extending beam, a deflectible member in the space intermediate said rollers and a pair of deformable members connected at their one ends to said deflectible member and extending therefrom outwardly in opposite directions for connection with said rollers adjacent the remote sides thereof, said deformable members normally supporting said deflectible member in predetermined spaced relation from said upwardly extending beam and deformable under load to permit said deflectible member to move into abutment with said upwardly extending beam in order to redistribute the loading on the latter beam so as to avoid excessive loading of said pair of rollers.

9. A combination as claimed in claim 8 wherein a second said deflection beam means is located in longitudinally spaced relation from the first mentioned deflection beam means and in rolling engagement with the opposite side of said upwardly extending beam, said second deflection beam means being also connected to said load supporting means and together with said first mentioned deflection beam means applying to said upwardly extending beam a force couple which varies with the load supported by said load supporting means, the deflectible member of each said deflection beam means being movable into abutment with adjacent portions of said upwardly extending beam on opposite sides thereof under predetermined loading on said load support means.

10. An upright construction for lift trucks including an upright beam, a load engaging means supported by said beam for vertical movement therealong, and a pair of vertically spaced deflection beam means mounted for rolling engagement upon opposite sides of the upright beam and supporting the load engaging means for guided movement along said upright beam, each of said pair of deflection beam means including a pair of vertically spaced rollers, deflectible means including a pair of bracket means secured to each of said pair of vertically spaced rollers and extending outwardly in opposite directions therefrom, a pair of arcuate spring members connected to each said pair of bracket means adjacent opposite outer ends thereof and spanning said pair of rollers circumferentially and extending into the space therebetween and deflectible member connected to the inner adjacent portions of said spanning arcuate members, said deflectible member being located between each said pair of rollers in predetermined spaced relation to the adjacent side of said upright beam and being movable into abutment with the adjacent surface of the upright beam upon the application of a predetermined load on said load supporting means which deflects said resilient arcuate members, whereby the loading on the upright beam is redistributed to prevent excessive loading on each said pair of rollers.

11. A lift truck upright as claimed in claimed 10 wherein a third roller is operatively connected to each said pair of rollers and on the side of said upright beam opposite the side associated with said pair of rollers, and bracket means connecting each said pair of rollers and said third roller to said load engaging means.

References Cited in the file of this patent
UNITED STATES PATENTS

| | | |
|---|---|---|
| 1,667,547 | Green | Apr. 24, 1928 |
| 2,246,628 | Heckman | June 24, 1941 |
| 2,260,922 | Spiro | Oct. 28, 1941 |
| 2,453,916 | Inskeep | Nov. 16, 1948 |
| 2,563,927 | Engle | Aug. 14, 1951 |